United States Patent [19]

Koski

[11] Patent Number: 4,820,091

[45] Date of Patent: Apr. 11, 1989

[54] TOOL AND METHOD FOR FORMING PANEL JOINTS

[76] Inventor: John T. Koski, 171 Honey La., Battle Creek, Mich. 49015

[21] Appl. No.: 140,298

[22] Filed: Dec. 31, 1987

[51] Int. Cl.[4] .................... B23C 0/00

[52] U.S. Cl. .................... 409/132; 408/197

[58] Field of Search .................... 409/132, 190, 234; 408/197, 231; 285/365

[56] References Cited

U.S. PATENT DOCUMENTS

| | | | |
|---|---|---|---|
| 4,416,340 | 11/1983 | Bailey | 285/365 |
| 4,606,684 | 8/1986 | Shaturov et al. | 409/132 |
| 4,632,609 | 12/1986 | Johne | 408/197 |
| 4,642,005 | 2/1987 | Kondo et al. | 409/232 |
| 4,669,933 | 6/1987 | Dye | 409/234 |
| 4,674,162 | 6/1987 | Wheeler | 409/190 |

*Primary Examiner*—Léon Scott, Jr.

*Attorney, Agent, or Firm*—Irvin L. Groh; Alfred L. Patmore, Jr.

[57] ABSTRACT

A rotary cutting tool and method for use of the cutting tool for forming complementary wavy joint surfaces in the edges of panels to be mounted in adjacent relationship to each other such as panels of sheet material used for counters, sink tops, stove tops, wall panels and the like. The uniform wave form cutting edge of the cutting tool is used to form complemetary wavy surfaces in adjacent adjoining surfaces so that a single tool can form both of the edges to be joined with the resultant edges guiding the planar surfaces of the panels into alignment with each other.

16 Claims, 1 Drawing Sheet

TOOL AND METHOD FOR FORMING PANEL JOINTS

This invention relates to a rotary cutting tool and its method of use for forming edge or butt joints in plastic and similar construction panels as they can be bonded together to form counters, sink and stove tops, wall panels, shower walls and similar constructions.

Heretofore, there has existed no fully satisfactory joint design for edge-joining plastic panels such as Corian, a panel material manufactured by the DuPont Company of Wilmington, Del. The DuPont Company currently recommends a plane surface butt joint.

Panels manufactured of Corian, and like materials, are not always of uniform thickness, their edges are not necessarily of sufficient uniformity to form a quality butt joint, and these panels have only one smooth, good face. In machining a plain butt joint it is sometimes necessary, therefore, to resurface the plane surface edges to be joined so that they touch, or very nearly touch, all along the joint. Because the panels are not always of uniform thickness, they must be placed in an approximate butt position, good side up, on a plane work surface, and the underside of one or both of the panels must be shimmed or otherwise adjusted in elevation at various points along and adjacent to the butt edges to bring the upper surfaces of the panels into a common plane.

When the shimming adjustments are deemed satisfactory, at least one of the panels must be moved so the bonding agent can be applied. The panel can then be replaced carefully into the butted position without disturbing the shims. Particularly for thin panels, suitable weights or pressures may be needed along the joint to hold the panels against the shim. Then the panels must be pressed or clamped together by any of several available means well knownn to those skilled in the art until the bonding agent sets. Thereafter, the excess, dried bonding agent must be removed, at least from the upper, good surface. If a good surface match has not been achieved, the panel surfaces must be appropriately sanded and polished to evenness and smoothness.

The foregoing procedure is time-consuming, requires considerable care and skill, and is not one of good, professional efficiency. Moreover, it does not length itself to the on-site construction environment, which is often necessary or desirable.

A novel rotary cutting tool and related methods have been provided for forming a wavy joint surface for use in edge or butt joining panels of plastic and like materials which are used for counters, sink tops, stove tops, wall panels, shower stalls and the like. The cutting tool can be used in portable powered routers, as well as stationary power equipment to cut a wavy profile with great precision. The cutting tool may be adjusted to a position exactly one-half of wave length from its original position for cutting a complementary wavy profile in the mating edge of a second panel.

It is an object of this invention to provide means for forming a joint which when pressed or clamped together will be self-indexing so that the good, smooth surfaces of adjacent panels will be forced into positions accurately occupying a mutual plane.

It is another object to provide a contact area of the joint which allows excess bonding agent and air to be expelled from between the joint surfaces rather than being entrained and thereby preventing full, surface contact of the joint surfaces.

Another object is to provide a joint component having a minimum of sharp corners or edges to minimize chipping and sustaining other accidental damage.

Yet another objective is to provide a joint area which is considerably greater than the area of a plane surface butt joint, thus increasing the strength of the joint.

A further object is to provide a single joint component cutter which may be used to cut the joint profile in a first panel and also for cutting the mating joint profile in a second panel.

Another object is to provide a single joint component cutter which may be used to cut joint profiles and mating joint profiles in panels of more than one nominal thickness.

The objects of the invention are accomplished by a cutting tool and method of using the tool in which a rotary cutter has a uniform wave form cutting edge radially spaced and symmetrical to the axis of rotation, the cutter being rotated about its axis with the cutting edge in engagement with a selected edge of one panel while the rotating cutter is moved relative to the selected panel with the axis of rotation of the cutting tool perpendicular to the face surface of the selected panel and with the cutter axially fixed in a first location to form a wave form groove in a selected edge. Subsequently, the cutter is moved parallel to the adjacent edge of another panel with the axis of the cutter perpendicular to the plane face surface of the other panel and with the cutter axially fixed in a second location spaced one half wave length from the first location to form a wave form groove in the other panel which is complementary to the wave form groove in the edge of the first panel and subsequently placing the panels in adjacent relation to each other with the wave form in the selected edges in adjacent panels complementary and engaging each other to locate the face surfaces in coplanar relationship.

These and other objects and advantages of the invention will be apparent from the following detailed description, appended claims and the accompanying drawings in which:

Figure 1:
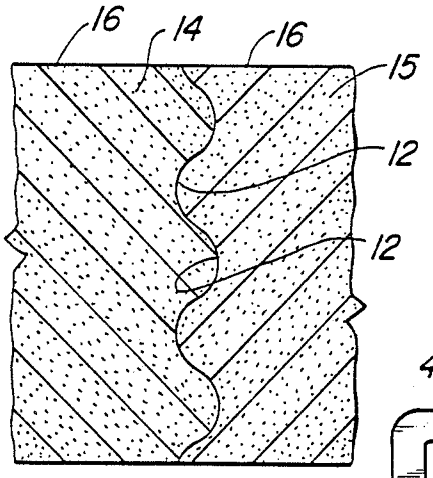
FIG. 1 is a cross sectional view of an edge joint between adjacent panels resulting from use of the apparatus and methods of the present invention.

The rotary cutting tool of the present invention is designated generally at 10 and is for the purpose of cutting longitudinally extending wave form surfaces or grooves 12 in the adjoining edges of panels such as panels 14 and 15 in FIG. 1. The wave form grooves 12 of the adjoining panels are complementary to each other and serve to engage each other to maintain at least one of the plannar face surfaces 16 of the panels in alignment with each other.

The rotary cutting tool 10 includes a shank 18 adapted to be received in a chuck 20 of a rotary power source such as a router 22. Extending axially from the shank 18 are a pair of radially extending flutes 24 having a wave form profile designated generally at 26.

Figure 4:
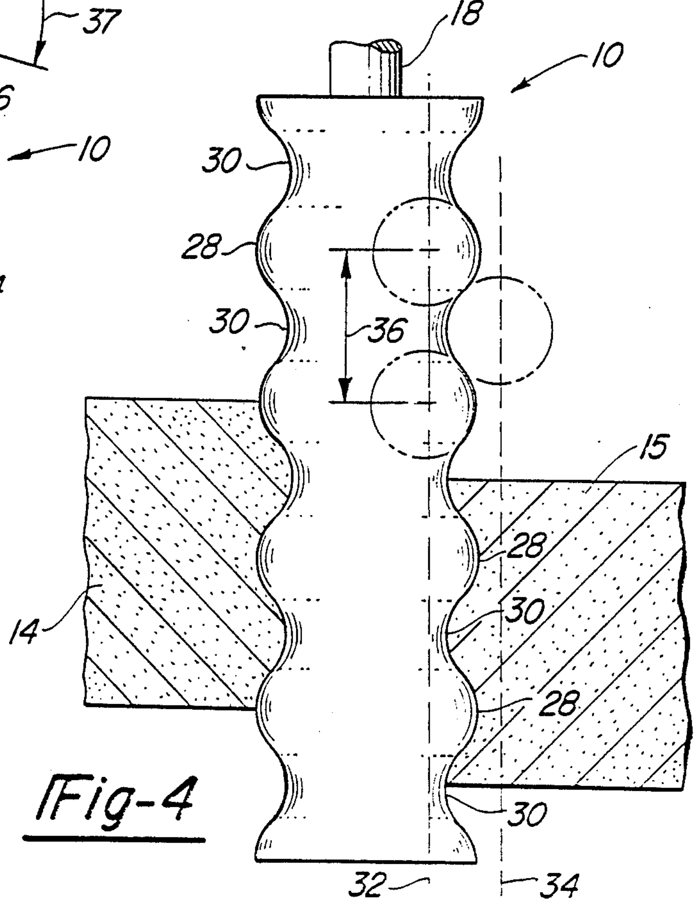
FIG. 4 is a diagrammatic view of the cutting tool illustrating the generation of the curved profile and the relationship of the cutting tool to adjacent panels to be joined.

The profile of the cutting edge of the rotary cutting tool 10 is of a wave form made up of a plurality of adjoining waves. Each full wave is made up of a convex half-wave 28 of uniform curvature and an adjoining concave half-wave 30 of uniform curvature. The convex half-wave portions 28 are arcs of circles having their centers of radius on a line 32 and the concave half-wave portions are arcs of circles hwaving their centers of radius on a line 34. The centers of radii on each of the lines 32 and 34 are spaced apart one full wave length as designated by the dimension 36 in FIG. 4. The centers of radii of adjacent concave and convex half wave portions 28 and 30 are displaced axially from each other the length of one-half of a wave as represented by the dimension.

In a preferred form of the invention and for the purpose of cutting the wavy profile into the edges of panels having a nominal thickness in multiples of one-fourth of an inch, such as one-fourth, one-half, and three-fourth of an inch, the wave length represented by the dimension 36 was selected at fourth of an inch. The height of the convex portion and the depth of the concave portion is determined by the spacing of the lines 32 and 34 which locate the centers of the radii. In a preferred form of the invention this was selected at one-half wave length or one-eighth of an inch. As a result the radius of curvature is 0.1397 inches and the full wave length is 0.25 inches. The total length of the cutter wave train was selected at five full wave lengthsgiving the cutting edge or wave train an axial length of 1.25 inches and beginning and ending at points of maximum convex amplitude.

Figure 3:
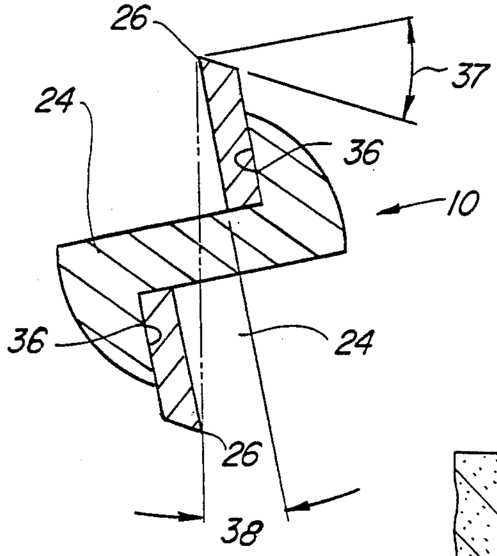
FIG. 3 is a cross-sectional view taken on line 3—3 in FIG. 2, but at an enlarged scale.

Referring now to FIG. 3 the profiles 26 of the cutting edge are formed in the tips of the flutes 24 which can be fabricated of tungsten carbide, polychrplalline diamond material or other suitable material and fixed in position in flute recesses 36. The cutting tool can be provided with a single flute 24 or with two or more flutes. In the preferred embodiment of the cutting tool 10 as viewed in FIG. 3, the tool rotates in a counter-clockwise direction and the tips of the flutes 24 have a relief angle 37 of about 15°. Also, the flutes 24 have a hook angle designated at 38 of about 10°.

Figure 2:
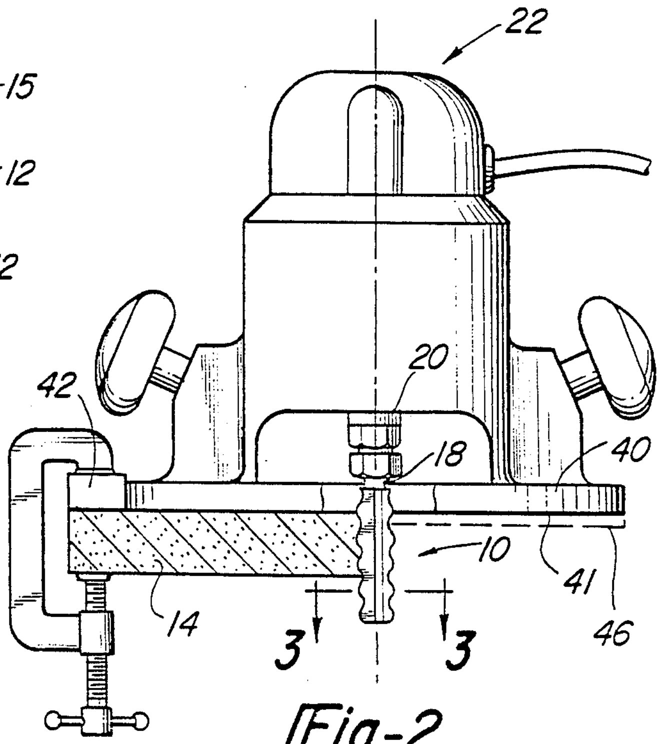
FIG. 2 is a side elevation of a router supporting the rotary cutting tool of the present invention.

Referring now to FIG. 2, the router 22 has an axially adjustable base 40, the underside 41 of which is flat and is intended to engage and slide on and relative to the face surface 16 of a panel. The underside of the base 40 is transverse to the axis of rotation of the tool 10.

To cut a wave form profile in the edge of a panel using a router 22 to rotate the tool 10, a fence 42 is clamped in position on the face 16 of a panel to extend parallel to the edge of the panel to be grooved. During operation of router 22, the base 40 is positioned on the face 16 of the panel with the edge of the base against the fence 42. With the tool 10 rotating rapidly, the router 22 is moved with the base in sliding engagement with the face 16 of the panel and the edge of the base against the fence 42. The result is a groove or grooves conforming to the wavy profile of the cutter.

To cut the wavy profile in the adjacent edge of an adjacent panel the base 40 of the router 22 is adjusted one-half wave length axially of the axis of rotation of the tool 10. Operation of the router 22 with respect to the second panel and with the tool 10 moved to a second elevation or location relative to base 40 results in a grooved surface in the adjacent panel which is complementary and will nest in the grooves formed in the first panel.

Following the formation of complementary grooves in the edges of adjoining panels one of the grooved surfaces can be coated with adhesive. Upon bringing the edges into mating relationship, air and excess adhesive is forced from between the mating concave and convex portions of the adjacent edges of the panel. The gentle wave form 12 prevents an accumulation of excessive adhesive and air to permit the edges to be brought into tight fitting engagement with each other. Moreover, the gentle wave form 12 has shallow concave portions or grooves and convex or tongue portions of minimum height which not only obviate a hydraulic effect of adhesive and air resisting mating and abutment of the edges, but also prevents chipping and breakage of edges as occurs with sharp edges which can result in fragments preventing exact alignment.

In order to avoid the need to accurately readjust the location of the cutting tool 10 relative to the base 40 of router 22 each time it is desired to change from one edge of one panel to form another edge of another panel a bi-level router base can be employed. As indicated in FIG. 2 one half of the base 40 can be modified as indicted in broken line at 46 to change the elevation of the underside of that portion of the router base 40. In such an arrangement one half of the underside of the router base at 46 is at a first elevation or location and the second part of the router base is at a second elevation or location, with the two elevations differing by one half of a cutter wave length or in the case of an actual embodiment of the invention, one-eighth of an inch. In operation, one portion of the base 40 is used to cut the wave form edge in the first panel, and the other portion of the base is used to cut the other edge of the adjoining panel. Use of such an arrangement enables a single router 22 to be used for cutting the adjoining edges of adjoining panels without readjustment. As an alternative, two routers 22 can be used one adjusted to make the cut in the first panel and the second router to make a cut in the second panel.

Although the wave form described in connection with the actual embodiment of the invention is of a circular form it should be understood that many other wave form cutting profiles can be used including parabolic, hyperbolic sine or cosine curves.

The cutting tool and its operation has been described in terms of use with a router tool. However, it should be understood that other forms of rotary power tools could be used such as molding machines with a molding head having the required cutting edge profile.

The embodiments of the invention in which an exclusive property or privilege is claimed are defined as follows:

1. A rotatable cutting tool for forming matching wave form profiles in the adjacent edges of panel members to be joined comprising:

a body member rotatable about an axis, at least one cutting blade extending radially from said axis, said cutting blade having a cutting edge formed of a plurality of adjoining waves extending generally axially, each of said waves including a concave one-half wave portion and an adjacent convex one-half wave portion, means for positioning said blade in a first position relative to the edge of a first flat panel member for movement relative thereto with the face of said panel bisecting a selected one-half wave portion during cutting of said edges of said first panel member, and means for positioning said blade in a second position relative to the edge of a second flat panel member with the face of said panel member bisecting a one-half portion wave adjacent to said selected concave half-wave portion during cutting of said edge of said second work piece whereby complementary wave form surfaces are formed in the adjacent edges of the panels to be joined.

2. The rotating tool of claim 1 including means forming a guide having a surface movable to a fixed axial position relative to the axis of rotation of said tool, said surface being movably engagable with a surface of a panel to position said cutting edge of said tool in a selected one of said first and second locations.

3. The cutting tool of claim 1 wherein said cutting edge is formed of at least four adjacent wave forms.

4. The process of claim 3 wherein said first location is selected so that the face of said panel bisects a selected concave one-half wave portion and said second location is selected so the face of the other of said panels bisects an adjoining concave one-half wave portion.

5. The cutting tool of claim 1 wherein each one-half wave form is the arc of a circle.

6. The cutting tool of claim 5 wherein the radius of each of said one-half wave forms is less than one-half wave length.

7. The cutting tool of claim 1 wherein each adjacent one-half wave form is the arc of a circle having its center of radius on a line spaced axially one-half wave length from the center of radius of the adjacent one-half wave form.

8. The cutting tool of claim 1 wherein said centers of radius of adjacent convex one-half wave forms are on a line parallel to the axis of rotation and one full wave length apart.

9. The cutting tool of claim 1 wherein said centers of radius of adjacent concave one-half wave forms are on a line parallel to the axis of rotation and one full wave length apart.

10. The cutting tool of claim 1 wherein the center of radius of said convex one-half wave forms are on a first line and the centers radius of adjacent concave one-half wave forms are on a second line, said first and second lines being spaced approximately one-half wave length apart.

11. The cutting tool of claim 1 wherein the radii of said concave and said convex one-half wave forms are equal.

12. The cutting tool of claim 1 further comprising means for rotating said tool, said means including a guide surface slidably engagable with a surface of a panel, one portion of said guide surface substantially bisecting a selected one-half wave portion and a second portion of said guide surface being displaced axially relative to said first portion and bisecting the adjoining one-half wave portion.

13. The process of claim 1 in which adhesive is applied to at least one of said selected edges of one of said panels prior to locating said panels in adjacent relationship to each other.

14. The process of claim 1 wherein said cutting edge is formed of a plurality of wave forms each having a convex one-half wave portion and an adjacent concave one-half wave portion.

15. The process of claim 1 wherein said cutter is supported relative to a guide movably engageable with a surface of said first panel to position said cutting edge in said first and second locations relative to said faces of said first and second panels.

16. A cutting process for producing complementary grooves in the edges of panels to be joined together with face surfaces in adjacent, coplanar relationship comprising the steps of:

providing a rotary cutting having a uniform wave form cutting edge extending radially and symmetrically to the axis of rotation, rotating said cutter about its axis with the cutting edge in cutting engagement with a selected edge of one panel, moving said rotating cutter and selected panel relative to each other with said cutter in engagement with said selected edge of said one panel and with the axis of rotation perpendicular to the plane of the face surface of said selected panel and with the cutter axially fixed in a first location to form a wave form in said selected edge, moving said cutter parallel to the adjacent edge of the other of said panels with the axis of said cutter perpendicular to the plane of the face surface of the said other of said panels and with the cutter axially fixed in a second location spaced one half wave length from said first location to form a wave form in said selected edge of said other of said panels complementary to the wave form in the edge in the first of said panels, and placing said panels in adjacent relation to each other with the wave form in said selected edges in complementary, engaging relation to each other to locate said face surfaces in coplanar relation.

* * * * *